United States Patent
Petricek

(10) Patent No.: US 11,576,246 B2
(45) Date of Patent: Feb. 7, 2023

(54) ILLUMINATION SYSTEM

(71) Applicant: ZACTRACK GMBH, Vienna (AT)

(72) Inventor: Werner Petricek, Vienna (AT)

(73) Assignee: ZACTRACK GMBH, Vienna (AT)

(*) Notice: Subject to any disclaimer, the term of this patent is extended or adjusted under 35 U.S.C. 154(b) by 112 days.

(21) Appl. No.: 17/044,821

(22) PCT Filed: Apr. 2, 2019

(86) PCT No.: PCT/EP2019/058246
§ 371 (c)(1),
(2) Date: Oct. 1, 2020

(87) PCT Pub. No.: WO2019/192989
PCT Pub. Date: Oct. 10, 2019

(65) Prior Publication Data
US 2021/0132181 A1 May 6, 2021

(30) Foreign Application Priority Data
Apr. 4, 2018 (DE) .................. 10 2018 002 765.2

(51) Int. Cl.
H05B 47/10 (2020.01)
H05B 47/155 (2020.01)
(Continued)

(52) U.S. Cl.
CPC .......... *H05B 47/155* (2020.01); *G01S 5/0264* (2020.05); *G01S 7/484* (2013.01);
(Continued)

(58) Field of Classification Search
CPC ...... H05B 47/17; H05B 47/19; H05B 47/115; H05B 47/125; H05B 47/165;
(Continued)

(56) References Cited

U.S. PATENT DOCUMENTS 5,023,709 A 6/1991 Kita et al.
8,755,561 B2 * 6/2014 Vlutters ............... G06V 10/145
713/176
(Continued)

FOREIGN PATENT DOCUMENTS

CH 671821 A5 9/1989
DE 102 14 227 A1 10/2003
(Continued)

OTHER PUBLICATIONS

International Search Report under International Application No. PCT/EP/2019/058246 dated Jul. 9, 2019.

*Primary Examiner* — Tung X Le
(74) *Attorney, Agent, or Firm* — Howard IP Law Group, PC

(57) ABSTRACT

The present invention relates to an illumination system (1) for illuminating an object (2) located in an object space (8), comprising an illumination unit (3) adapted to emit illumination light (4b) into the object space (8), a distance measuring unit (5) for taking a distance image (41) of the object space (8) with the object (2) located therein, which distance measuring unit is arranged in relation to at least a part of the illumination unit (3) so that it is fixed at this part of the illumination unit, a marker system (6) with a marker emitter unit (66a) for emitting a marker signal (7), and a marker receiver unit (6ab) for detecting at least a portion (7a) of the marker signal (7), wherein the illumination system (1) is configured to localize the object (2) on the basis of the distance image (41) within an area of the object space (8) and individualise the object using the signal portion received with the marker receiver unit (6ab) and to illuminate the object (2) accordingly with the illumination unit (3).

19 Claims, 4 Drawing Sheets

(51) Int. Cl.
  *H05B 47/115*   (2020.01)
  *G01S 7/484*    (2006.01)
  *G01S 5/02*     (2010.01)
  *G01S 17/894*   (2020.01)
  *H05B 47/125*   (2020.01)

(52) U.S. Cl.
  CPC .......... *H05B 47/115* (2020.01); *G01S 17/894* (2020.01); *H05B 47/125* (2020.01)

(58) Field of Classification Search
  CPC ....... H05B 47/175; G01S 7/484; G01S 7/497; G01S 7/4915; G01S 17/894
  See application file for complete search history.

(56) References Cited

U.S. PATENT DOCUMENTS

| | | | |
|---|---|---|---|
| 9,196,067 B1 | 11/2015 | Freed et al. | |
| 10,375,789 B2* | 8/2019 | Bosua | F21V 23/0442 |
| 10,701,253 B2* | 6/2020 | Knoll | G06V 40/23 |
| 2013/0193855 A1* | 8/2013 | Bauer | H05B 47/18 |
| | | | 315/151 |
| 2018/0160507 A1* | 6/2018 | Feeney | G06F 3/033 |
| 2020/0371226 A1* | 11/2020 | Otto | G01S 13/867 |

FOREIGN PATENT DOCUMENTS

| | | |
|---|---|---|
| DE | 10 2007 057 757 A1 | 6/2008 |
| EP | 0 814 344 A2 | 12/1997 |
| WO | 2016/051018 A1 | 4/2016 |

\* cited by examiner

ILLUMINATION SYSTEM

CROSS-REFERENCE TO RELATED APPLICATIONS

This application is the national stage application under 35 U.S.C. § 371 of International Application No. PCT/EP2019/058246 filed on 2 Apr. 2019, which claims priority to DE 102018002765.2 filed 4 Apr. 2018, the entire disclosures of which are incorporated herein by reference in their entireties.

TECHNICAL FIELD

The present invention relates to an illumination system for illuminating an object located in an object space.

PRIOR ART

The illumination system in question in the present description can be used, for example, to illuminate a stage, such as one used in the entertainment sector, for example a concert stage. An objective is an at least partially automated or fully automated illumination which, for example, adjusts adaptively depending on a position or a movement of an actor on the stage. For example, a light spot can automatically follow an actor on the stage. Such an actor may be, for example, a presenter or performer, but it can of course be any other object on which an automated illumination is focusing, for example vehicles or animals etc., see below for more details. This is given for illustrative purposes only and should not be considered as constituting any limitation of the invention in its generality

DESCRIPTION OF THE INVENTION

The object of the present invention is to provide a particularly advantageous illumination system.

According to the invention, this object is solved with an illumination system according to claim 1. In addition to an illumination unit for emitting the illumination light, this illumination system also has a distance measuring unit for recording a distance image, and a marker system. The distance measuring unit is used to take a distance image within a given field of view (FoV), therein referred to as an object space. Unlike a conventional two-dimensional image, this distance image also includes distance information, effectively a depth (further details of the possibilities for technical implementation are given in the disclosure which follows). The distance image can, for example, be structured such that a distance value is assigned to each pixel, which is also referred to as a space pixel or voxel. In principle, this corresponds to three-dimensional points in the object space. In a space where the object is located, a large number of pixels typically have a similar distance value (specifically also dependent on the size, orientation etc. of the object), and a point cloud results therefore.

The inventor has found on the one hand that an object located in an object space can easily be localized within the object space, or at least within an area of this object space, based on a distance image, for example by evaluating or taking as a basis a point cloud such as that described above. This point cloud can be identified as part of an image processing procedure, for example, using a gradient or grey scale value method. Apart from in special situations (see below for details), an object located within the object field can therefore generally be localized reliably and also with sufficient precision.

On the other hand, however, detection and classification of an object based on the distance image can be calculation-intensive and therefore take a long time, which can be problematic given the dynamic illumination operations. Even the distance image itself can have a limited resolution, allowing the location of the object to be determined with sufficient precision, but no further differentiation is possible, for example. By way of illustration, for example, it can be hard to further differentiate whether the object identified is actually the presenter or performer to be illuminated or a stagehand, for example. Any number of similar examples can also be found for other objects or categories of objects.

The marker system is therefore additionally provided. The object to be illuminated, for example the performer, is equipped with the marker emitter unit, and the marker signal or a portion of signal emitted by the marker emitter unit is then detected with the marker receiver unit. The illumination system is then set up to individualise the object using the portion of signal received by the marker receiver unit. By evaluating the portion of signal, information additional to the distance image is obtained on the basis of which it can be decided, for example, whether or not the object is to be illuminated. The "individualisation" of the object can, for example, result in the area identified on the basis of the distance image not being sufficiently precise for the decision regarding the illumination, for example if several actors or objects are casting a shadow over each other, and the marker signal is then used to pinpoint and therefore individualise the object within the area (see below for more details).

In summary, the combination of distance measuring unit and marker system allows good localization within the object space on the one hand and individualisation of the object on the other hand. The latter means that a marker or label is assigned to the object in an abstract observation, which can, for example, simplify a decision-making diagram for the automation, or generally increase reliability and/or shorten decision-making processes. In addition, the distance measuring unit is arranged on or next to the illumination unit, producing a good correlation between the distance image and the illuminated space, in other words reducing calculation work and therefore allowing quick response times, for example.

Preferred embodiments can be found in the dependent claims and the disclosure as a whole, wherein a specific distinction is not made between the device aspects and the method or use aspects when describing the features; the disclosure is to be read implicitly with all categories of claims in mind. The description therefore always focuses on both the illumination system, which is configured for a certain operating mode, and on a corresponding operating method or corresponding uses.

A particular advantage of the illumination system is derived from the arrangement of the distance measuring unit on the illumination unit, fixed on at least one part of the illumination unit (generally on a base, also referred to as a lamp base or lamp holder, see below). This spatial proximity or even integration (the distance measuring unit could, for example, also be recessed into the base) can simplify the subsequent correlation of the distance image with the control of the illumination unit. Figuratively speaking, the detected object corresponds to what the illumination "sees" or what it is illuminating.

In slightly more abstract terms, the distance measuring unit and illumination unit are located within the same coordinate system based on the side by side arrangement. Transformations of coordinates involving extensive calculation and therefore taking a long time can be avoided, for example, which can be particularly advantageous in view of the quick movements (e.g. dance or sport, etc.) sometimes arising in the applications under discussion.

In a simple example, it can even be sufficient if the marker system for its part is not set up for a more detailed spatial differentiation within the object space. This can relate, for example, to an application scenario in which different objects are to be illuminated differently over time, for example different performers each with an illumination light of a different colour, but these objects or actors for dramatic reasons only appear in the object space one after the other anyway (not simultaneously). In this case, it is sufficient if the corresponding label visually speaking is stored for the entire object field (and there is only one actor in this field) by the respective marker emitting unit assigned to the respective object. Conversely, this example also illustrates that a more detailed differentiation may be of interest in more complex application scenarios, see below for more detail. The device of course also works without a marking unit as long as only one performer is on the stage. If this is ensured, and this also applies to a large number of portrayal situations, the performer does not need a marking unit. The blob detection finds the target person anyway and can control the spotlight. Primarily where there are several blobs, and particularly if these blobs overlap, there is a decision-making problem.

The distance image is measured on the basis of the signal propagation time using the distance measuring unit. To this end, an electromagnetic pulse is emitted into the object space, and in general a number of pulses are emitted sequentially. If a respective pulse hits the object, it is reflected back to the distance measuring unit proportionally from its surface, and it can be recorded as an echopulse using a suitable sensor. If the emission of the pulse occurs at one time $t_0$ and the echopulse is detected at a different time $t_1$, the distance d from the reflective surface of the object can be determined using the propagation time $\Delta t_A = t_1 - t_0$ on the basis of the following equation:

$$d = \Delta t_A c/2 \qquad \text{Equation 1}$$

where c is the value of the speed of light.

In general, a distance measuring unit which has solid angle resolution on just one axis is also conceivable, for example, but preferably there is solid angle resolution on two axes. The object space can therefore be divided into rows and columns and therefore into solid angle segments, with one distance value being determined for each segment.

Depending on the specific embodiment, either the distance measuring unit can emit a respective pulse for measuring the distance into the entire object space, including in the case of a solid angle resolution, or the pulses can be emitted sequentially (one after the other) into different segments of the object space (also referred to as "scanning mode"). The first variant mentioned can nevertheless produce a solid angle resolution in conjunction with a solid angle-sensitive detector, see below for more details. In the case of the last variant mentioned, the solid angle-selective emission, in other words the sequential pulsing of the individual segments, can be achieved, for example using a movable mirror (e.g. MEMS mirror). Before a respective subsequent pulse is emitted, a certain pause corresponding to the desired range is allowed to elapse ("listening" in visual terms) to see whether an echopulse is returned by the segment in question.

Where it is generally the case that the illumination system is "configured" for a certain operating mode, this means, for example, that a corresponding programme sequence is stored in a control unit. The possibilities for implementation in the software are as equally diverse (standardised protocols such as DMX or ARTNet or alternatively any other/proprietary customised programmes and languages) as those of the hardware-related architecture. The control unit can be integrated into the illumination unit, either in part or in its entirety, but a decentralised design is also possible, for example. To control the illumination unit, there can be an interface for the commands to control the illumination, but an integral design is also possible. The control unit, or parts thereof, can be implemented in a conventional computer, for example, but an individual design with microcontrollers is also possible.

There is preferably a user interface for input and/or output, preferably a display unit for graphical representation, also referred to as a graphical user interface (GUI), which in particular can also be designed as a touchscreen. In the application, the illumination unit can actually be operated fully automatically (with no user intervention), but partially automatic operation or switching backwards and forwards between automatic operation and user control are also possible, for the latter of which there is preferably a console. The programmes referred to above of course do not have to be static; they can be adapted by a user using an interface, for example, but an AI programme for autonomous learning or optimisation of actions and courses of action are also possible.

In a preferred embodiment, the marker emitter unit is part of a marker device, which also has a receiver unit. The marker receiver unit is also part of a marker device, which further has an emitter unit. The marker devices are each adapted symmetrically for sending and receiving (two-way system), and they are preferably identical in design to each other. Apart from reducing the number of different parts and therefore increasing the user-friendliness, the symmetrical design can also offer advantages in terms of, for example, a calibration process, for instance if multiple marker receiver units are provided to determine their positions relative to each other. The two-way or symmetrical design is preferably implemented with the same signal type, in particular a radio signal (e.g. UWB, see below, also with regard to possible alternatives).

In a preferred embodiment, the marker system is radio-based, in other words the marker signal is a radio signal. Where for example an ultrasonic or, in the electromagnetic spectral range, a radar or infrared signal is generally conceivable, a radio signal can allow a technically robust and adequate implementation. As a general rule, the marker emitter unit could also be a RFID tag, for example, but preferably it is a two-way system, see below. The radio frequencies are below 3000 GHz (with a possible lower limit in the MHz range). Ultra-broadband technology (UWB) is preferably used for the marker signal, which technology is particularly suitable for short-range communication.

In a preferred embodiment, not only is the distance measuring unit arranged on or next to the illumination unit, but the marker receiver unit is as well. Even if integration into a movable part of the illumination unit is generally conceivable, an arrangement on or in the base is again preferred. The distance measuring unit and the marker unit can in particular be provided so as to be fixed relative to each other.

In a preferred embodiment, the distance between the emitter unit and receiver unit is determined from the signal portion detected with the marker receiver unit. To this end, the signal intensity can for instance be detected, wherein the distance at a known output power is determined from the decrease in power. If multiple marker receiver units are provided, the distance measurement can also allow location of the object by means of the marker signal (see also for more details). However, the distance measurement can, on the other hand, also be of interest and advantageous as such, for example improve the localization in conjunction with the distance image. If there are multiple objects in the object space, a final decision on the position of the object on the basis of a distance image may be problematic if, for example, another object is in front of it as seen from the distance measuring unit, and is therefore casting a shadow over it to a certain extent. The overshadowed object can nevertheless be localized using the distance value obtained from the marker signal.

In a preferred embodiment, the marker system comprises a further marker receiver unit, with which a portion of the marker signal is detected. Advantageously, the illumination system can then be configured so that a position of the marker emitter unit and therefore the objects is determined from the signal portions detected with the different marker receiver units by means of a triangulation.

For example, a first signal portion can therefore be received with a first marker receiver unit and a second signal portion can be received with a second marker receiver unit, wherein the receiver units are advantageously arranged at a certain distance from each other, either at or next to the object space, for example at the edge of a stage or even on the stage. The marker emitter unit and the receiver units then together span a triangle, and the object can be localized on the basis of the signal portions. By way of illustration and example, a first distance value can be determined from the first signal portion, which in abstract terms corresponds to a circle around the first marker receiver unit on the two-dimensional plane of the stage. The second signal portion produces a circle around the second marker receiver unit, and the object can be located at the point of intersection of the circles. More marker receiver units can be provided, allowing for greater precision.

In a preferred embodiment, the illumination unit is adapted to emit a cone of light, respectively along one of different beams. Although these beams point in different directions, they originate from a shared origin in a polar coordinate system. One possibility for implementation is what is known as a scanner, wherein the cone of light emitted from a light source falls on a mirror mounted so as to be rotatable or tiltable and is reflected in a respective direction depending on the position of rotation or tilting. Similarly, it is conceivable that multiple spotlight heads are provided, which, fixed in position or movable relative to each other, emit their respective cones of light in their own individual direction. In general, a design is preferred wherein the same cone of light is directed into different directions over time, which advantageously allows the object to be tracked. This is possible with, for example, the aforementioned scanner or a headlamp with a movable head as discussed in detail below.

One or more light-emitting diodes (LED), possibly in the form of micro-LEDs, can be used as a light source. This light source can take the form of at least one individually housed LED or at least one LED chip which has a single or multiple light-emitting diodes. Multiple LED chips can be mounted on a shared substrate ("submount") and form a LED or be attached individually or together on a printed circuit board (e.g. FR4, metal core printed circuit board, etc.), for example ("CoB"=chip on board). The at least one LED can be equipped with at least one separate and/or shared lens for guiding the beam, for example with at least one Fresnel lens or a collimator. Instead of, or in addition to anorganic LEDs, such as LEDs based on AlInGaN, InGaN or AlInGaP for example, organic LEDs (OLEDs, e.g. polymer OLEDs) can generally also be used.

Furthermore, quantum dot light diodes can also be used. The LED chips can be directly emitting or have an upstream phosphor. Alternatively, the light-emitting component can be a laser diode or a laser diode arrangement, for example a LARP arrangement (laser-activated remote phosphor). It is also conceivable that one OLED light layer or multiple OLED light layers or an OLED light range may be provided. The emission wavelengths of the light-emitting components can be in the ultraviolet, visible or infrared spectral range. The light-emitting components can also be equipped with an individual converter. Furthermore, halogen lamps and discharge lamps can also be used.

In its preferred embodiment, the illumination unit has a base and an arm, and a lamp head (preferably exactly one lamp head) for emitting the illumination light. The arm is rotatably mounted on the base and the lamp head is rotatably mounted on the arm. In the application, the illumination unit is then preferably aligned such that a plane of rotation created by the mounting of the arm on the base lies horizontally, also referred to as a pan (the axis of rotation around which rotation takes place lies perpendicular to said plane of rotation). A plane of rotation created by the rotatable mounting of the lamp head on the arm then preferably lies vertically, the corresponding degree of freedom is also referred to as the tilt (the axis of rotation is again perpendicular to said plane of rotation).

Generally, the distance measuring unit is attached to a base of the illumination unit in a preferred embodiment. From an abstract point of view, the distance measuring unit is fixed in position relative to the aforementioned origin of the polar coordinate system of the illumination, with reference to the advantages mentioned above (no transformation of coordinates required etc.). A distance measuring unit arranged close to the illumination unit, for example at a distance of no more than 1.5 m, 1 m or 0.8 m away (with possible lower limits at 0.1 m or 0.2 m), can be advantageous. The distance is measured between the entrance pupil of the distance measuring unit and the light-emitting surface of the illumination unit (if this distance varies over time based on a movable mounting of the lamp head, an average value is taken into account).

In a preferred embodiment, the distance measuring unit is attached to the base by means of a holder and it can be tilted, together with this holder, into a range of different positions relative to the base. In general, infinitely variable tilting in combination with a locking mechanism, for example, is also conceivable, and a plurality of predefined tilting positions are preferably specified. The distance measuring unit can be locked into place in a respective tilting position, for example, or can be fixed in place with a stop screw. Despite this adjustability, the distance measuring unit is then again fixed and held in place relative to the base.

In a preferred embodiment, there is a plane spanning the infinitely variable tilting positions or tilting positions with predefined adjustments parallel to a plane of rotation created by the mounting of the lamp head on the base. The lamp head is preferably not directly mounted, but is mounted via an arm on the base (see above) and the aforesaid plane of rotation is created by the mounting of the arm on the base, see above (pan). The plane spanned by the different tilting positions lies perpendicular to an axis of rotation, around which the different tilting positions can merge into each other.

In a preferred embodiment, the distance measuring unit is adapted to emit pulses in the infrared spectral range for the distance measurement. The wavelengths can therefore be, for example, at least 700 nm, 750 nm, 800 nm or 850 nm, with possible (non-contingent) upper limits at, for example, no more than 2000 nm, 1800 nm or 1600 nm (in both cases with increasing preference in the orders specified). A particularly advantageous value can lie, for example, at around 905 nm, producing further advantageous upper limits of 1500 nm, 1400 nm, 1300 nm, 1200 nm, 1100 nm, 1000 nm or 950 nm.

Regardless of the specific spectral range, the distance image can be obtained in different ways, meaning that there are different possibilities for implementing the solid angle resolution. This is discussed in the remarks at the beginning of this description. The solid angle resolution can be obtained on the one hand from a solid angle-selective emission of the electromagnetic pulses; the solid angle segments are therefore scanned. A movable or swivelling mirror, such as a MEMS mirror, is generally provided for this, by means of which mirror a laser beam is typically guided into the object space. Depending on the position of the mirror, the laser beam or laser pulse enters a respective segment of the object space, and the segments are pulsed one after the other (wherein a certain period of time is allowed to elapse in each case to see whether an echopulse is returned).

In an alternative approach, a light or beam pulse is emitted throughout the entire object space, in other words in all segments simultaneously, wherein the differentiation between the different segments is then obtained from a sensor with solid angle resolution, for example a photonic mixer device, also known as a PMD sensor. The sensor can assign echopulses arriving from the different directions in space and therefore from the different segments, thereby producing the pixel-by-pixel or segment-by-segment resolution.

In a preferred embodiment, a TOF camera which works according to the principle just described using a sensor with solid angle resolution is provided as a distance measuring unit. The light pulse is emitted throughout the object space, and for each image dot the time which elapses until an echo pulse arrives is measured. By way of illustration, such a solid angle resolution can be obtained by, for example, combining a conventional image sensor, e.g. CCD or CMOS, and an upstream lens, which maps the sensor surface ad infinitum, each pixel in its respective own direction of space. Conversely, an echopulse arriving from a respective direction in space is therefore guided to a respective dedicated pixel (or a pixel group). Regardless of the specific configuration, around 20 images (frames) per second, for example, can be taken with a typical TOF camera, which may be adequate for the present applications.

In a preferred embodiment, the illumination system is set up so as to classify the object using the marker signal or signal portion. Such categories of objects can be "person" and "vehicle" or "animal", wherein further differentiation is of course also possible. For example, in the case of persons, a distinction can be made between performers or extras and stagehands or even members of the audience. Vehicles can be land-based vehicles, for example, such as motor vehicles, including in a miniaturised form, or alternatively airborne vehicles, such as drones.

In general, robots, for example, can be added to one of these categories or be assigned to a category of their own. Furthermore, a distinction can be made, for example, between the stage set and the actual actors, in other words between, for example, the stage equipment including speakers etc. on the one hand and the actors or the music group or persons acting in any other capacity (presenter etc.) on the other hand. The approach according to the invention of using an additional marking can be advantageous to the extent, for example, that parts at least of the stage set itself may be movable (e.g. movable on rails or freely movable, for example flying on a drone), which can make distinguishing these from the actors challenging.

In general, the marker signal can preferably contain object information, and the classification can then preferably be performed on the basis of this information alone. Regardless of a subsequent classification, the object information can be contained in the modulation of a preferred radio signal, for example by means of the carrier frequency or in the preferred UWB operating mode in which individual pulses are generated by means of a pulse phase modulation or a change in the polarity or amplitude of the pulses.

A data set obtained from the distance image and the marker signal can of course be expanded to include further input data; for example, an acoustic detection of rhythms and/or also songs or spoken text, for example, can be added. Similarly, it is conceivable, for example, that faces or geometric data in particular are detected with an additional camera or a scanner. Regardless of the specific details of the case at hand, the data set obtained can then be compared against various databases, a list or parameter record can therefore be stored for each category of object, for example. Using the corresponding data memories, the control unit can be connected directly or alternatively be connected via a network or a cloud connection. This of course also applies to databases with details of the der illumination unit (light control database, lamp database, illuminant database, etc.).

Further input variables can be derived, for example, from control systems of cable winches, airframes, stage machinery, both overstage and understage machinery, rotary encoders, linear encoders, photoelectric sensors and/or limit switches. Similarly, it is conceivable that additional influencing variables, relating for example to step counts, direction of movement, position and/or orientation (gyroscope information), can be detected via a smartphone, and user-specific data such as a heart rate etc. can also be input.

Methods already familiar in principle can be used to evaluate the distance image. It can be analysed by means, for example, of morphological filtering of a geometric structure (which can form the basis of the detection of an image), and an analysis of threshold values, image segmentation, edge detection and/or colour analysis can also be applied to the distance image. By means of what is known as connected component labelling, linked object and data points can be found and grouped, a process which is occasionally also referred to as blob detection. In principle, it is also conceivable that the distance image is combined with a further distance image (referred to as stitching) which is taken with a further distance measuring unit, which is also arranged on the illumination unit, to increase the angular coverage. However, precisely one distance measuring unit is preferably provided on the illumination unit.

The invention also relates to a method for operating an illumination system described above, wherein the object is equipped with the marker emitter unit, preferably with a two-way system (marker device) as described above. This system, or device, then emits, during operation, the marker signal which is detected with the marker receiver unit, which is preferably also part of a marker device. The marker receiver unit can be arranged, for example, on the edge of the stage, preferably together with one or more further marker receiver units. At the same time, the distance image of the object space is recorded with the distance measuring unit, and on the basis of this distance image the object is localized in the object space, or at least within an area of the object space. The marker signal and the signal portion(s) detected are used to individualise the object. The object can preferably also be localized on the basis of the marker signal, which can increase the precision.

Specifically, not only one distance image is then recorded during operation, ideally, but a number of distance images are taken one after the other over time, for example at least 5 or 10 distance images per second (due to technical constraints, there may be upper limits of, for example, no more than 50, 40 or 30 distance images per second). If a TOF camera is preferably used, this camera generally does not emit only a single pulse to record a respective distance image, but a package of pulses, in other words several individual pulses one after the other. This results in a corresponding plurality of echopulses, and the signal-to-noise ratio can be improved by averaging, for example.

In a preferred embodiment, a reference distance image of the object space is first of all taken using the distance measuring unit. The distance measuring unit is already in its position relative to, for example, the stage, and the reference distance image is then taken as part of setup or a calibration. The object subsequently to be illuminated is not yet within the object space, but other objects such as stage equipment etc. are already ideally arranged on their positions. If the distance image of the object space is subsequently taken together with the object within this space during operation, the reference distance image can be used for an assessment of the differences. Those pixels or voxels forming a static background can be removed from the calculation and do not have to be taken into account any further in the evaluation of the image. This can reduce the amount of calculation required and help reduce response times.

In a preferred embodiment, a plurality of distance images are taken one after the after (see above) during operation, in other words during illumination, when the object is located within the object space. As part of an assessment of the differences, these distance images are then set in proportion to each other, and movement trajectories can be obtained, for example. If the object moves through the object space, for example, and if the object is followed with a cone of light, a projection can be made on the basis of the movement trajectories. A future vector is therefore created from the previous distance images, which can also be referred to as prediction modelling. It can therefore be predicted within a range of, for example, up to 200 ms, where the object will be located and the control of the illumination unit can be adapted or prepared for the future accordingly.

The observations of the differences can also be used, for example, to allow pixels or voxels which are currently moving to be weighted differently to pixel/voxels which have been idle for a prolonged period of time. It is therefore possible not only for a static background to be deducted (reference distance image, see above), but also for a dynamic adjustment to be weighted more heavily/less heavily. Pixels/voxels static for a prolonged period of time are then, for example, no longer evaluated with the same precision as the moving pixels/voxels. They can also be removed from the calculation in the subsequent distance images.

The invention also relates to the use of an illumination system, described above, for illuminating a performance area. This can be in particular a stage, such as a concert or show stage, in particular an arena, but of course also a theatre stage or similar. The performance can also take place in a trade fair, for example, so an illumination of trade fair areas or similar is in particular therefore also possible. Applications in film making and television work are also conceivable, as are applications for illuminating dance floors, including in discotheques.

A plurality of illumination units, each fitted with a fixed distance measuring unit, can also be combined in an application. They can illuminate the performance area from, for example, different sides, but also from the same side. Depending on the specific arrangement, the number of illumination units with distance measuring units (in particular TOF cameras) can be increased as required, particularly if the object spaces do not overlap or only partially overlap. On the other hand, an upper limit may also be of interest, for example to prevent an undesirable interaction between the individual TOF measurements. For example, no more than 10, 8 or 6 illumination units or systems equipped according to the invention can be combined in the same performance area.

In a group of illumination units, the object information or object coordinates determined by an illumination system according to the invention, or the assigned control unit, can then be used to control further illumination units, for example to illuminate a shared object.

If there are multiple objects which are to be illuminated differently, these are preferably each fitted with an individual marker emitter unit (in particular a respective marker device), wherein an individual piece of object information in each case is preferably modulated for the respective marker signal. Despite the additional marking using a marker emitter unit, a limit to the number of different objects or the number of objects to be distinguished may also be advantageous. The application may involve, for example, a maximum of 10, 8 or 6 objects to be distinguished and illuminated differently.

Relative to the performance area, the illumination unit together with the distance measuring unit can be provided so as to be fixed, for example mounted on a fixed stand or support. On the other hand, however, an illuminated unit mounted so as to be offset in relation to the performance area, in particular so as to be movable, is conceivable. As the distance measuring unit is fixed relative to the illumination unit, or to the base thereof, the correlation discussed above between the reference or coordinate systems is not nullified if this unit as a whole is moved. The illumination unit can be movable, together with the entire distance measuring unit, on a rail, for example, but an arrangement on a robotic arm, for example, is also conceivable.

BRIEF DESCRIPTION OF THE DRAWINGS

The invention is explained in further detail below on the basis of an embodiment, wherein the individual features may also be material to the invention in a different combination within the context of the independent claims and a specific distinction is again not made between the different categories of claims.

Specifically.

PREFERRED EMBODIMENT OF THE INVENTION

Figure 1:
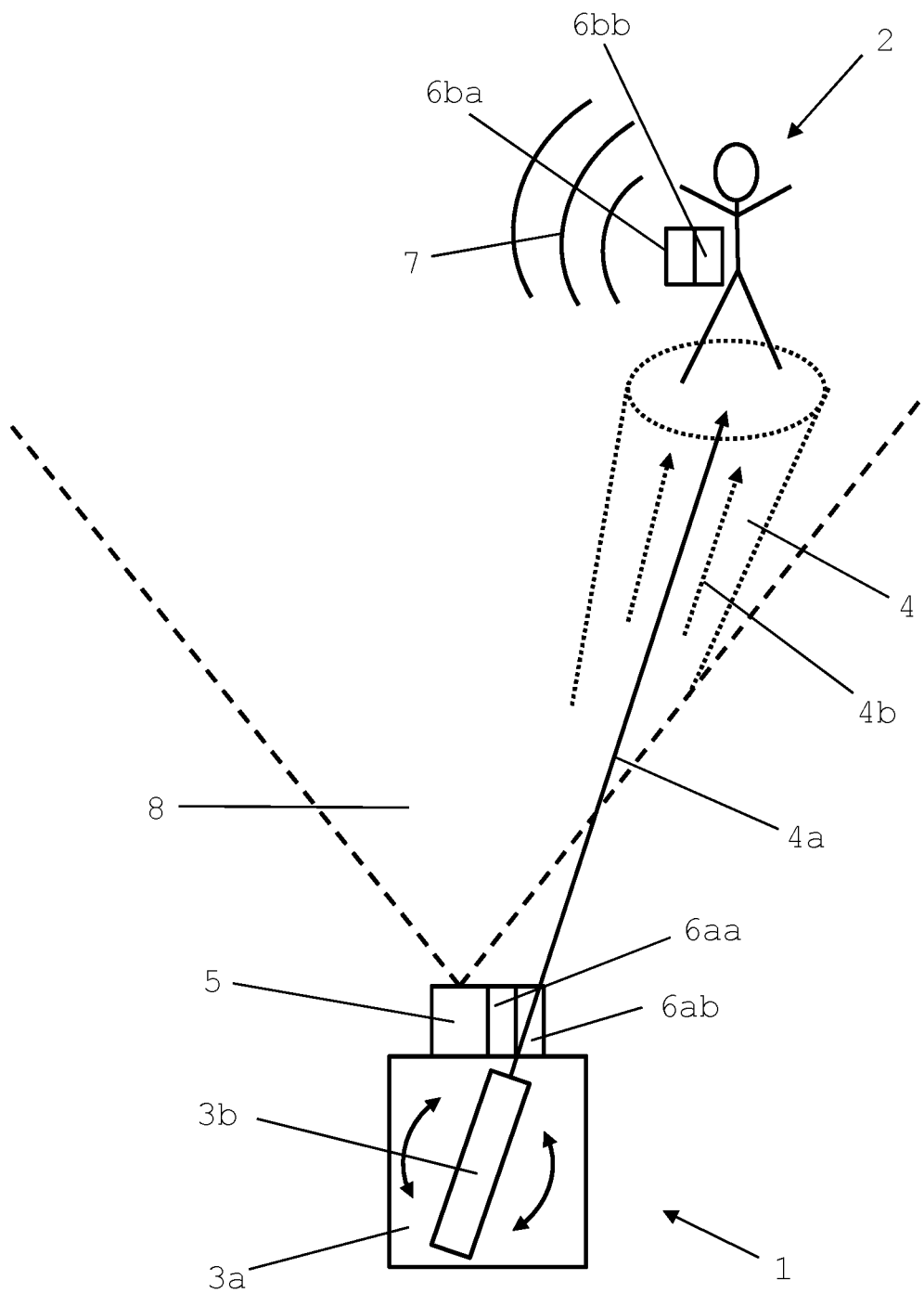
FIG. 1 shows a view of an application of an illumination system according to the invention as seen from above looking down onto a stage.

FIG. 1 shows a schematic representation of an illumination system 1 according to the invention, by way of illustration in an application. This involves the illumination of an object 2, such as a performer or presenter on a stage (see below for more details). To this end, the illumination system has an illumination unit 3 in the first instance. This is constructed from a base 3a and a lamp head 3b movably mounted thereon; further details can be seen in FIG. 2. An illuminant, for example an LED-based illuminant, generally combined with a lens, is arranged in the lamp head 3b. During operation, a cone of light 4 with the illumination light 4b can be emitted, along a beam 4a at least, with the lamp head 3b. Due to the movable mounting of the lamp head 3b, the cone of light 4 can be moved across the performance area.

The illumination system 1 further has a distance measuring unit 5, in this case a TOF camera. A distance image of an object space 8 can be taken with this camera, thus allowing the object 2 to be localized on the basis of the distance image. The cone of light 4 can then automatically be directed at the object 2, by means of a corresponding activation of the illumination unit 3, or follow this object, if it is movable. To this end, the distance image is evaluated, see also FIG. 4 and the details given in the introduction to the description.

The distance measuring unit 5 is attached to the base 3a of the illumination unit 3. This is advantageous insofar as the TOF camera is looking onto the performance area or stage from the same position from which the performance area or stage is illuminated. Put in simple terms, the distance measuring unit and illumination units 5, 3 are therefore arranged in the same reference system, allowing the detection of the object 2 in the distance image to be implemented directly in a control of the illumination unit 3 (in particular in pan/tilt coordinates).

The illumination system 1 further has a marker system 6, wherein a first marker device 6a and a second marker device 6b are shown in the case at hand. The former is arranged on a base 3a of the illumination unit 3, while the latter is on the body of the performer. Each of the marker devices 6a,b has an emitter unit 6aa,ba and a receiver unit 6ab,bb. During operation, the marker emitter unit 6ba assigned to the performer, therefore to the object 2, emits a marker signal 7 (a UWB signal). This signal, or a portion of this signal, is detected with the marker receiver unit 6ab assigned to the base 3a of the illumination unit 3. The marker signal 7 can, for example, contain information about the object 2, on the basis of which information this object can be individualised or the illumination can be adjusted (e.g. "object to be illuminated: yes/no" or alternatively "type of illumination: colour etc."). Further possibilities are also described in FIG. 3.

The symmetric design of the marker devices 6a,b can be advantageous in a calibration phase, for example, when the illumination system 1 is being installed on the stage. Further details are given in the introduction to the description.

Figure 2:
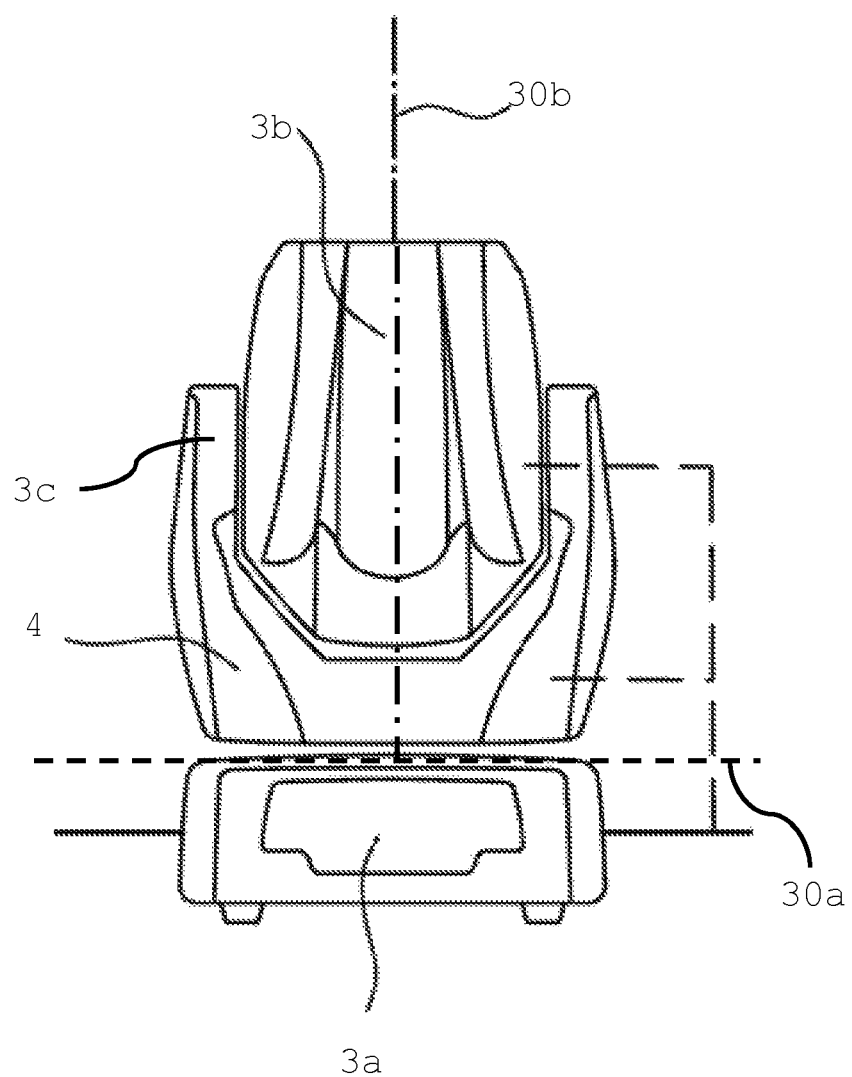
FIG. 2 shows a detailed view of an illumination unit of the illumination system according to FIG. 1.

FIG. 2 shows the illumination unit 3 in further detail, as a side view. The illumination unit 3 is designed as a spotlight with a movable head, while the lamp head 3b is mounted by means of an arm 3c on the base 3a. The arm 3c is rotatable, relative to the base 3a, on a plane of rotation 30a which in the present description and also in the application is horizontal (pan). The lamp head 3b is mounted on the arm 3c so as to be rotatable on a plane of rotation 30b. The plane of rotation 30b is vertical (tilt) in the present case and in the application. With the lamp head 3b mounted accordingly, the cone of light 4 can be moved across the performance area or stage, and in particular the object 2 can be followed.

Figure 3:
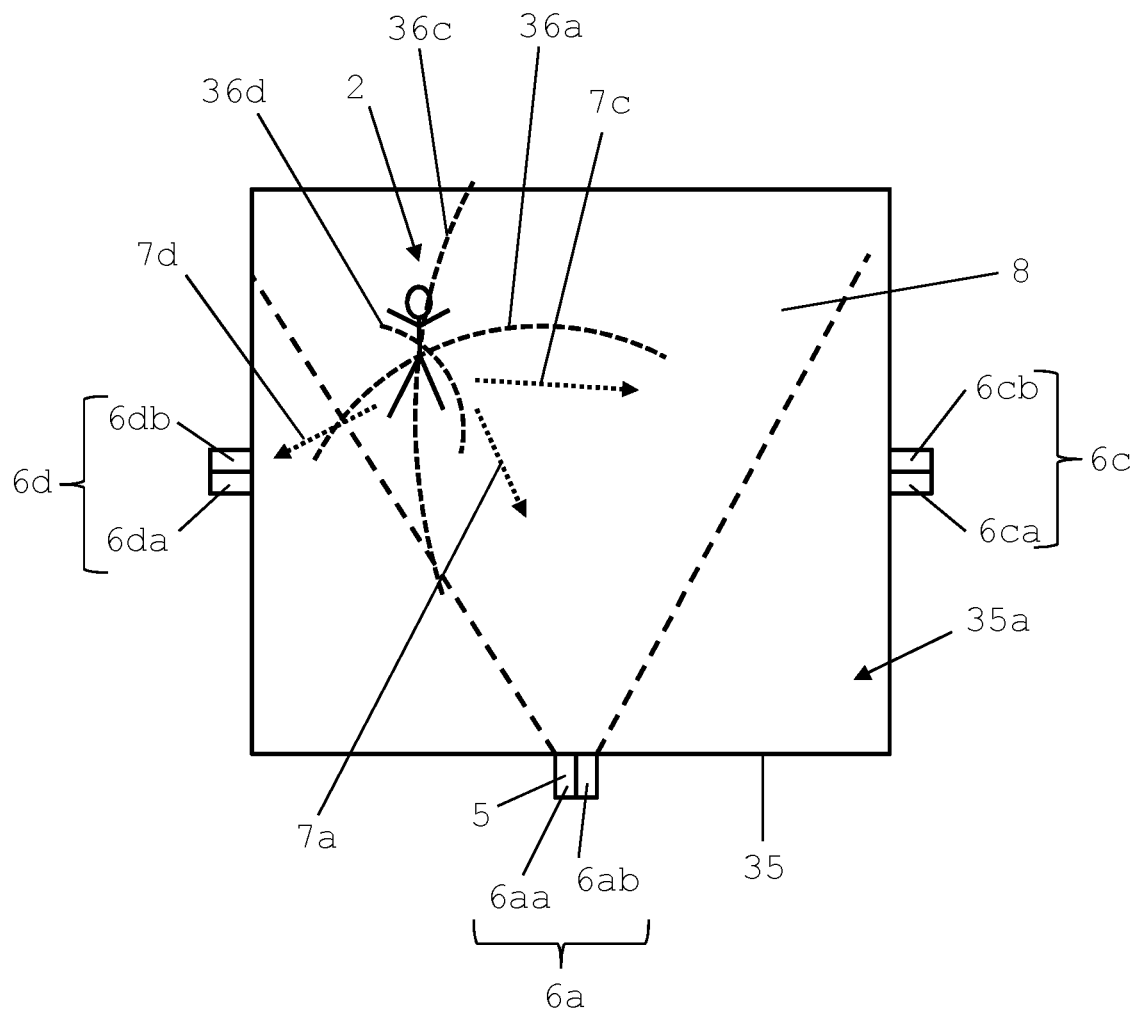
FIG. 3 shows a schematic representation of a marker system, again as seen looking down onto a stage, as part of the illumination system according to FIG. 1.

FIG. 3 shows a schematic representation of a stage 35, looking down from above onto the performance area 35a. The view therefore corresponds to that according to FIG. 1, but unlike FIG. 1 the illumination unit 3 is not specifically described in this figure. Instead, the figure particularly illustrates the marker system 6 in further detail. Not only the marker unit 6a, but also two further marker devices 6c,d are arranged on the edge of the stage 35. There are therefore two further marker receiver units 6cb,db.

Each of the marker receiver units 6ab,cb,db receives a respective portion 7a,c,d of the marker signal 7. With knowledge of the output power, a respective distance value is calculated from the decrease in power using the respective signal intensity detected. Each marker unit 6ab,cb,db therefore inherently produces a separate circle 36a,c,d in which the object 2 may be located. As several measurements taken from different positions are available, the object 2 can thus be localized, namely at the point of intersection of the circles 36a,c,d. The marker receiver units 6ab,cb,db are each part of a bidirectional marker device 6a,c,d. As part of setup or a calibration, the relative distances of the units from each other, for example, can be determined. The object 2 can then be localized by means of a triangulation.

Figure 4:
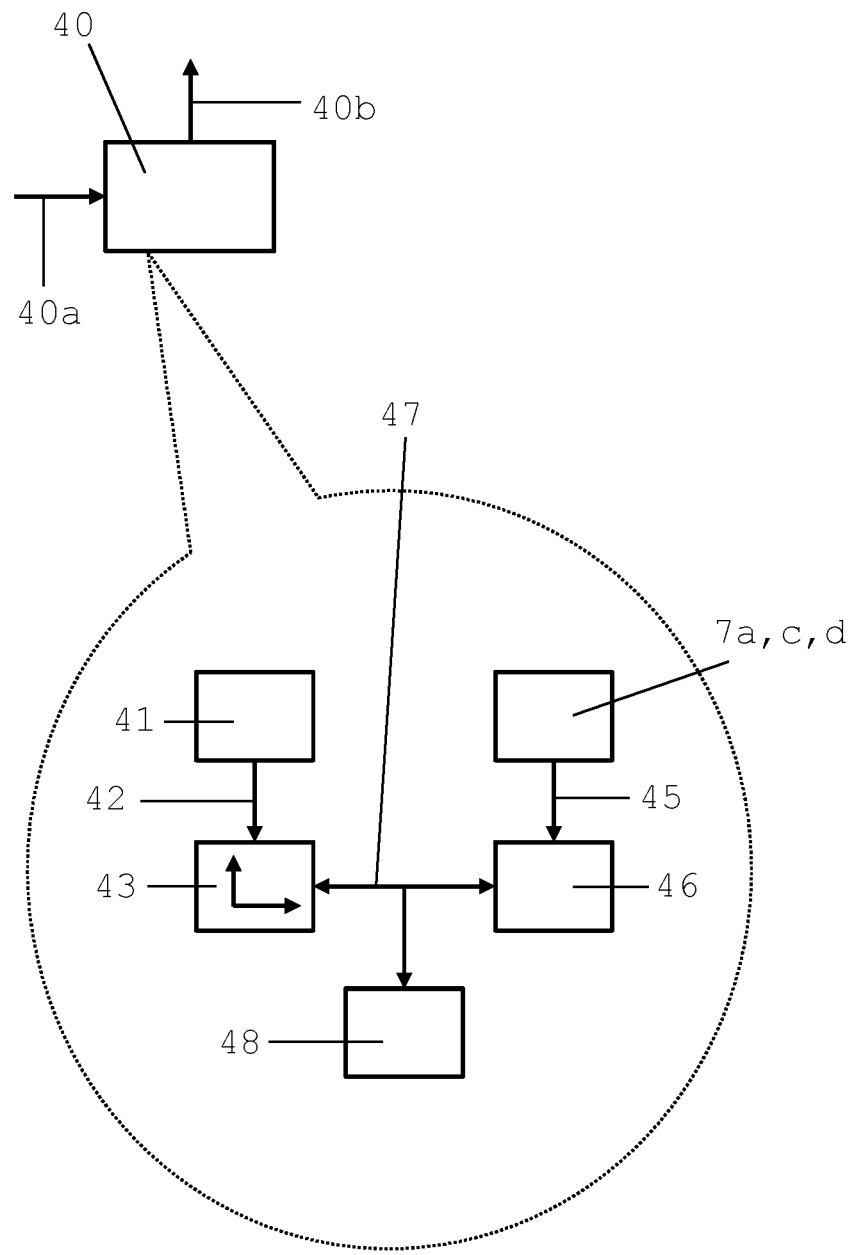
FIG. 4 shows a flow chart to illustrate the processes involved in detecting and illuminating an object with the illumination system according to FIG. 1.

FIG. 4 illustrates in a flow chart the processes in a control unit 40 of the illumination system 1. The control unit 40 has one or more inputs 40a for the distance image or distance images and the measurement results of the marker receiver units 6ab,cb,db, and further has one or more outputs 40b for outputting commands to the illumination unit 30 (either directly to this illumination unit or to a control unit thereof). One input variable is therefore on the one hand the distance image 41, wherein a number of distance images of the object space 3 are recorded over time, for example at a repeat rate of 20 Hz.

Specifically, the TOF camera can emit pulses within the object space with, for example, a pulse duration of 41 ns and pauses of the same duration between pulses, wherein a pulse package with, for example, 40000 pulses can be used as a basis for recording a respective distance image. The duration of this pulse package is then 3.5 ms, which specifies a measuring time frame for phase images. A pulse frame can then consist of four pulse packages spaced at 1.6 ms, producing a duration of 20.4 ms for the pulse frame. This is the measuring time frame for the 3D images.

In general, the durations of the pulses and/or pauses and also the number of pulses per package can be preset within the camera. On the other hand, however, a demand- and application-based parameterisation is possible, for example during or before starting up the illumination system. It may even be possible to perform an adaptation during ongoing operation. A certain variability may be of interest in, for example, an application with multiple TOF cameras, to prevent artefacts resulting from mutual influencing.

As FIG. 4 shows, the distance image is then subject to an image processing procedure 42. In the case of the TOF camera this can particularly be carried out in combination with the 2D camera image; from the 3D distance image, target points, also known as blobs, are identified in the object space 6. As a result, information is then available based on a coordinate space 43 indicating the point or points at which objects are located which may be of interest in terms of illumination. It should be noted here that the representations according to FIGS. 1 and 3 are schematic in nature and that in practice there will often be a larger number of actors on the stage 35. In particular, situations can arise in which some of the actors are behind each other as seen by the TOF camera, meaning that the actors can no longer be clearly located in the resulting coordinate system 43 based on the distance image 41. On the other hand, there can also be situations in which the decision on the illumination profile to be used can be a challenge if there is only a single actor on the stage (e.g. during a temporal changeover with other actors who cannot be differentiated on the basis of the distance image 41).

The signal portions 7a,c,d detected with the marker receiver units 6ab,cb,db are therefore used as underlying further input variables, wherein object information 46 is obtained as part of an evaluation 45. This information can include a position of the object on the performance area 35a determined by means of triangulation and/or information about the category of object. Regardless of the location according to FIG. 3, different objects can therefore, for example, be coded with their own individual object information and be made identifiable to the control unit 40.

Based on a correlation 47 between the result of the evaluation of the image on the one hand and the evaluation of the object information on the other hand, the actual illumination plan 48 can then be produced. From the pinpointing in the coordinate system 43, pan/tilt values for the activation of the illumination unit 3 can be generated, for example, and this can be done still within the control unit 40 or alternatively in the control device of the illumination unit 3.

Specifically, what are known as light codes can then be programmed and/or stored for the illumination. These can be fixed, e.g. "Follow the object"/"Illuminate with a different colour after 10 seconds" etc., but an adaption during operation is also conceivable (e.g. resolved as a result of certain movements of the object, such as jumping). Possible control functions of the illumination unit can include, for example, pan, tilt, dimmer, focus, zoom, frost, colour, relative iris, relative focus and/or relative dimmer, but a correlation with other effect fixtures and/or stage fixtures (including clothing etc., including that of the audience) or with effects on video projection and LED walls is also conceivable.

REFERENCE LIST

Illumination system 1
Object 2
Illumination unit 3
Base 3a
Lamp head 3b
Arm 3c
Cone of light 4
Beam 4a
Illuminated light 4b
Distance measuring unit 5
Marker devices 6a-d
Emitter units 6aa,ba,ca,da
Receiver units 6ab,bb,cb,db
Marker signal 7
Signal portions 7a, c, d
Object space 8
Plane of rotation (pan) 30a
Plane of rotation (tilt) 30b
Stage 35
Performance area 35a
Circles 36a,c,d
Control unit 40
Inputs 40a
Outputs 40b
Distance image 41
Image processing 42
Coordinate space 43
Evaluation (marker signal) 45
Object information 46
Correlation 47
Illumination plan 48

The invention claimed is:

1. An illumination system for illuminating an object located in an object space, comprising
an illumination unit adapted to emit illumination light into the object space,
a distance measuring unit for taking a distance image of the object space with the object located therein, wherein the distance measuring unit is arranged in relation to at least a part of the illumination unit so that it is fixed at this part of the illumination unit,
a marker system comprising a marker emitter unit for emitting a marker signal and a marker receiver unit for detecting at least a portion of the marker signal,
wherein the illumination system is configured to
localize the object within an area of the object space on the basis of the distance image and individualise the object using the signal portion received with the marker receiver unit, and
illuminate the object accordingly with the illumination unit.

2. The illumination system according to claim 1, wherein the marker emitter unit is part of a first marker device which also has a receiver unit, and wherein the marker receiver unit is part of a second marker device which also has an emitter unit.

3. The illumination system according to claim 1, wherein the marker system is radio-based, the marker signal being a radio signal.

4. The illumination system according to claim 3, wherein the radio signal is a UWB signal.

5. The illumination system according to claim 1, wherein the marker receiver unit is arranged in relation to at least a part of the illumination unit so that it is fixed at this part of the illumination unit.

6. The illumination system according to claim 1, wherein the distance measuring unit is configured to determine a distance of the marker emitter unit from the marker receiver unit based on the portion of the marker signal detected by the marker receiver unit.

7. The illumination system according to claim 6, wherein the marker system has a further marker receiver unit for detecting at least a portion of the marker signal, the illumination system being configured to determine a position of the marker emitter unit relative to the marker receiver units from the signal portions by means of a triangulation.

8. The illumination system according to claim 1, wherein the illumination unit is adapted so as to emit a cone of light along each of different beams pointing in different directions, the different beams having a shared origin in a polar coordinate system.

9. The illumination system according to claim 8, wherein the illumination unit includes a base and an arm, and a lamp head for emitting the illumination light, wherein the arm is rotatably mounted on the base and the lamp head is rotatably mounted on the arm.

10. The illumination system according to claim 1 wherein the distance measuring unit is fixedly attached to a base of the illumination unit.

11. The illumination system according to claim 10, further comprising a holder, by means of which the distance measuring unit is fixedly attached to the base, and whereby the distance measuring unit can be moved with the holder into different tilting positions relative to the base.

12. The illumination system according to claim 11, further comprising a lamp head for emitting the illumination light, wherein the illumination unit is rotatable on a plane of rotation relative to the base, and wherein a plane spanned by the different tilting positions of the holder lies parallel to the plane of rotation.

13. The illumination system according to claim 1, wherein the distance measuring unit is adapted so as to emit pulses in the infrared spectral range for the distance measurement.

14. The illumination system according to claim 1, wherein the distance measuring unit is a TOF camera.

15. The illumination system according to claim 1, wherein the illumination system is configured to classify the object using the signal portion detected with the marker receiver unit.

16. A method for operating an illumination system for illuminating, via an illumination unit, an object located in an object space, the method comprising:
   providing the object with a mark emitter unit for emitting a marker signal;
   detecting the marker signal with a marker receiver unit;
   recording a distance image of the object space with the object according to a distance measuring unit;
   localizing the object within at least an area of the object space on the basis of the distance image; and
   individualizing and illuminating the object on the basis of the marker signal.

17. The method according to claim 16, further comprising obtaining a reference distance image of the object space prior to the object being in the object space, which reference distance image is then used for an assessment of the differences as part of an evaluation of the distance image.

18. The method according to claim 16, wherein, when the object is located in the object space, a plurality of distance images are taken one after the other and are used for an assessment of the differences as part of an evaluation.

19. The method according to claim 18, wherein the plurality of distance images taken one after the other are used to determine movement trajectories.

* * * * *